United States Patent Office 3,493,577
Patented Feb. 3, 1970

3,493,577
2-AZA-ADAMANTANE-1-AMINE
André R. Gagneux, Basel, Switzerland, assignor to Geigy Chemical Corporation, Ardsley, N.Y., a corporation of Delaware
No Drawing. Filed Nov. 14, 1966, Ser. No. 593,702
Claims priority, application Switzerland, Nov. 18, 1965, 15,908/65
Int. Cl. C07d 29/28; A61k 27/00
U.S. Cl. 260—293                          2 Claims

ABSTRACT OF THE DISCLOSURE 2-aza-adamantane-1-amine prepared by catalytically hydrogenating the dioxime of bicyclo[3.3.1]nonan-3,7-dione is a hypotensive agent.

---

The present invention concerns a process for the production of a new amine, this amine itself as new substance which can be used in particular as an intermediate product, and also its acid addition salts.

It has surprisingly been found that 2-aza-adamantane-1-amine of Formula I

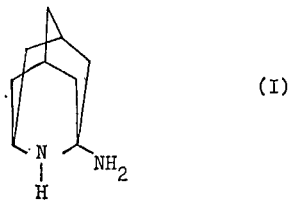

is obtained when the dioxime of bicyclo[3.3.1]nonan-3,7-dione of Formula II

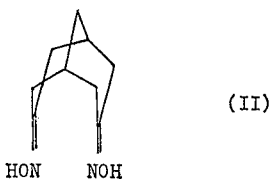

is reacted in an acid medium with catalytically activated hydrogen until about three times the molar amount has been taken up. For example, the oxime of Formula II is hydrogenated in an organic solvent which is miscible with water to a limited extent or completely, such as ethanol, dioxane or tetrahydrofuran, to which a mineral acid, e.g., about 2–10% by volume of concentrated hydrochloric acid, has been added. The hydrogenation is performed in the presence of a noble metal catalyst such as platinum oxide at room temperature and normal pressure.

The dioxime required as starting material is, in its turn a new compound and can be produced from the known bicyclo[3.3.1]nonan-3,7-dione by known methods. It can be used in the cis or trans form or as a mixture of both forms as it is obtained when produced from the diketone.

Due to its primary amino group, the new 2-aza-adamantane-1-amine is an intermediate product which can be used in many ways, particularly for the production of pharmaceuticals.

The new 2-aza-adamantane-1-amine of Formula I obtained by the process according to the invention is then, if desired, converted into its addtion salts with inorganic and organic acids in the usual way. For example, the acid desired as salt component or a solution thereof is added to a solution of the amine in an organic solvent such as methanol, ethanol or ether, and the precipitated salt is isolated. For example, hydrochloric acid, hydrobromic acid, sulfuric acid, phosphoric acid, methane sulfonic acid, ethane sulfonic acid, β-hydroxyethane sulfonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid can be used for the salt formation.

The new 2-aza-adamantane-1-amine exhibits a hypotensive activity.

The following example further illustrates the preparation of the new 2-aza-adamantane-1-amine of Formula I and of a hitherto undescribed intermediate product, but it in no way limits the scope of the invention. The temperatures are given in degrees centigrade.

EXAMPLE (a) 15.2 g. (0.1 mole) of bicyclo[3.3.1]nonan-3,7-dione (produced according to H. Stetter et al., Chem. Ber. 96, 694 [1963]) in 250 ml. of ethanol are added dropwise at 20° to a solution of 27.7 g. (0.4 mole) of hydroxylamine hydrochloride and 21.2 g. (0.2 mole) of sodium carbonate in 300 ml. of water. The mixture is stirred for 24 hours at 60° and is then concentrated at 50° and under reduced pressure. 250 ml. of water are added to the residue which is then extracted three times with 200 ml. of methylene chloride each time. The combined extracts are dried over potassium carbonate and concentrated (yield of raw product: 80–90%). On recrystallisation of the residue from dioxane, bicyclo[3.3.1]nonan-3,7-dioxime is obtained. It decomposes at 240–242°.

The nuclear magnetic resonance spectrum confirms the assumed structure and shows that it is a mixture of cis and trans dioxime.

(b) 12.0 g. (66 mM.) of bicyclo[3.3.1]nonan-3,7-dioxime in 350 ml. of ethanol in the presence of 35 ml. of concentrated hydrochloric acid and 2.0 g. of pre-hydrogenated platinum oxide, are hydrogenated within 18 hours at 20° and normal pressure; about 5.8 equivalents, 180 mM. of hydrogen are taken up.

After filtering off the catalyst, the filtrate is evaporated to dryness. The residue is distributed between 250 ml. of methylene chloride and 200 ml. of 2 N sodium hydroxide solution. The aqueous phase is separated and extracted with two 100-ml. portions of methylene chloride. The combined organic phases are dried over potassium carbonate and concentrated. Sublimation of the residue under 0.1 torr at from 80° to 10° yields 6.85 g. of 2-aza-adamantane-1-amine, which melts at 185–187° (yield: 68%).

To prepare the dihydrochloride, 1.82 g. (10 mM.) of the base are dissolved in 10 ml. of isopropanol and hydrochloric acid in isopropanol is added until there is a strongly acid reaction. The crystals of the dihydrochloride are filtered off and recrystallised from isopropanol/methanol (9:1). The dihydrochloride decomposes at 270°.

I claim:
1. A compound selected from among:
 (a) 2-aza-adamantane-1-amine, and
 (b) a pharmaceutically acceptable acid addition salt thereof.

2. Process for the preparation of 2-aza-adamantane-1-amine which comprises reacting the dioxime of bicyclo[3.3.1]nonan-3,7-dione of the formula

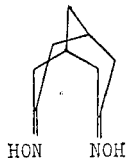

in an acid medium with hydrogen in the presence of a noble metal catalyst until about three times the molar amount has been taken up, and recovering the 2-aza-adamantane-1-amine.

References Cited

Paden et al.: J. Am. Chem. Soc. 58, 2487–99 (1936).
Stetter et al.: Chem. Ber. 96, 694 (1963).
Stetter et al.: Chem. Ber. 97 (12), 3480–7 (1964).

HENRY R. JILES, Primary Examiner

G. T. TODD, Assistant Examiner

U.S. Cl. X.R.

260—294, 2932, 2934, 999